United States Patent
Kuang et al.

(10) Patent No.: US 9,063,606 B2
(45) Date of Patent: Jun. 23, 2015

(54) CONTROL DEVICE FOR A TOUCH PANEL

(75) Inventors: Yu Kuang, Hsinchu (TW); Yong Nien Rao, Hsinchu (TW); Shih Tzung Chou, Zhudong Township, Hsinchu County (TW); Tsung Lin Wu, Sanchong (TW)

(73) Assignee: Raydium Semiconductor Corporation, Hsinchu (TW)

( * ) Notice: Subject to any disclaimer, the term of this patent is extended or adjusted under 35 U.S.C. 154(b) by 692 days.

(21) Appl. No.: 13/338,493

(22) Filed: Dec. 28, 2011

(65) Prior Publication Data

US 2012/0182255 A1    Jul. 19, 2012

(30) Foreign Application Priority Data

Jan. 17, 2011   (TW) .............................. 100101580 A

(51) Int. Cl.
*G06F 3/041*    (2006.01)
*G06F 3/044*    (2006.01)

(52) U.S. Cl.
CPC ............ *G06F 3/0416* (2013.01); *G06F 3/0418* (2013.01); *G06F 3/0412* (2013.01); *G06F 2203/04104* (2013.01); *G06F 3/044* (2013.01)

(58) Field of Classification Search
CPC ..... G06F 3/0416; G06F 3/044; G06F 3/0428; G06F 3/0421; G06F 3/0418; G06F 3/041; G06F 3/0412; G06F 2203/04104; H03K 17/962

See application file for complete search history.

(56) References Cited

U.S. PATENT DOCUMENTS

| | | | |
|---|---|---|---|
| 8,743,071 B2 * | 6/2014 | Moussavi ...................... | 345/173 |
| 2007/0262966 A1 * | 11/2007 | Nishimura et al. ........... | 345/173 |
| 2008/0042994 A1 * | 2/2008 | Gillespie et al. .............. | 345/174 |
| 2009/0244029 A1 * | 10/2009 | Huang et al. .................. | 345/174 |
| 2013/0050140 A1 * | 2/2013 | Chu .............................. | 345/174 |

* cited by examiner

*Primary Examiner* — Dwayne Bost
*Assistant Examiner* — Nalini Mummalaneni

(57) ABSTRACT

The present invention discloses a control device for a touch panel that comprises a plurality of X-directional sensing lines and Y-directional sensing lines. The X-directional sensing lines and Y-directional sensing lines are arranged in an interlaced manner. The control device comprises a clock generation circuit, a selection module, a driving signal generation circuit, a differential detection module, and a digital-to-analog conversion module. The selection module selects a first sensing line and a second sensing line from the X-directional sensing lines or Y-directional sensing lines. The driving signal generation circuit generates first and second driving signals to the first and second sensing lines, respectively. The digital to analog conversion module selectively outputs a first voltage to the first sensing line or outputs a second voltage to the second sensing line. The operation frequency of the touch panel can be increased using the control device of the present invention.

4 Claims, 9 Drawing Sheets

CONTROL DEVICE FOR A TOUCH PANEL

BACKGROUND OF THE INVENTION

1. Technical Field

The present invention relates to a control device for a touch panel.

2. Background

Touch panel is popularly used in appliance, communication device and electrical information device. Touch panel is usually used as input interface, such as personal digital assistant (PDA), electrical product and games. Today, the integration trend of touch panel and display screen can allow user to choose icon shown on the screen by finger or stylus, then personal digital assistant, electronic product and games can execute favorite function. Such touch panel can also used in public information inquiry system, then the public can operate the system more efficiently.

FIG. 1 shows a schematic diagram of a touch panel 10 according to the prior art. The touch panel 10 comprises a plurality of X-directional sensing lines X1-Xm and a plurality of Y-directional sensing lines Y1-Yn, wherein m and n are different or identical positive integer. The X-directional sensing lines X1-Xm and the Y-directional sensing lines Y1-Yn are buried on different layers of the touch panel 10. Referring to FIG. 1, the X-directional sensing lines X1-Xm and the Y-directional sensing lines Y1-Yn are arranged in an interlaced manner to form a sensing grid. In the sensing grid, a plurality of mutual capacitor form between each X-directional sensing line and each Y-directional sensing line, and a plurality of parasitic capacitance form between each X-directional sensing line, Y-directional sensing line and ground.

In conventional operation, a driving signal (usually a square wave signal) inputs to the X-directional sensing line or the Y-directional sensing line. A plurality of sensing voltages are generated on corresponding Y-directional sensing line or X-directional sensing line by coupling effect of mutual capacitor. Because the value of the sensing voltage changes by touch condition of the user and sensing line, a touch position of the user can be known by detecting the difference of the sensing voltage.

However, in conventional technology, the driving signal is simultaneously applied to all X-directional sensing lines or Y-directional sensing lines on the touch panel, then the delay time is pretty long based on the parasitic capacitance and a resistance of sensing line, and seriously affects the operation frequency of the driving signal and the detection time of the sensing voltage, and degrade with the increasing of the size of the touch panel. Therefore, a control device for the touch panel is used to improve the previous problem.

SUMMARY

The present invention discloses a control device of a touch panel. The touch panel comprises a plurality of first directional sensing lines and a plurality of second directional sensing lines, the first directional sensing lines and the second directional sensing lines are arranged in an interlaced manner. The control device according to one embodiment of the present invention comprises a clock generation circuit, a selection module, a driving signal generation circuit, a differential detection circuit and a digital to analog conversion module. The clock generation circuit generates a clock signal. The selection module select a first sensing line and a second sensing line between the first directional sensing line and the second directional sensing line. The differential detection circuit detects the voltage of the first sensing line and the second sensing line to generate a comparative signal. The driving signal generation circuit applied to the first sensing line and the second sensing line based on the clock signal generates a first driving signal and a second driving signal. The digital to analog conversion module selectively outputs a first voltage to the first sensing line or outputs a second voltage to the second sensing line based on the comparative signal and the clock signal.

The control device according to another embodiment of the present invention comprises a clock generation circuit, a level shift circuit, a voltage generation module, a selection module, a differential detection circuit and a first and second capacitor. The clock generation circuit generates a first clock signal and a second clock signal based on a reference clock signal, wherein the first clock signal comprises a plurality of pulses, and the frequency of the second clock signal can be a half of the reference clock signal frequency or equivalent to the frequency of the reference clock signal. The selection module selects a first sensing line and a second sensing line between the first directional sensing line and the second directional sensing line. The level shift circuit generates a driving signal based on the voltage level of the second clock signal. The differential detection circuit generates a comparative signal for detecting the voltage of the first sensing line and the second sensing line. The voltage generation module generates a first applied voltage and a second applied voltage based on the comparative signal, the first clock signal and the driving signal. The first capacitor couples between the voltage generation module and the first sensing line to response the variation of the first applied voltage to the first sensing line. The second capacitor couples between the voltage generation module and the second sensing line to response the variation of the second applied voltage to the second sensing line.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention are illustrated with the following description and upon reference to the accompanying drawings in which.

DETAILED DESCRIPTION

Figure 1:
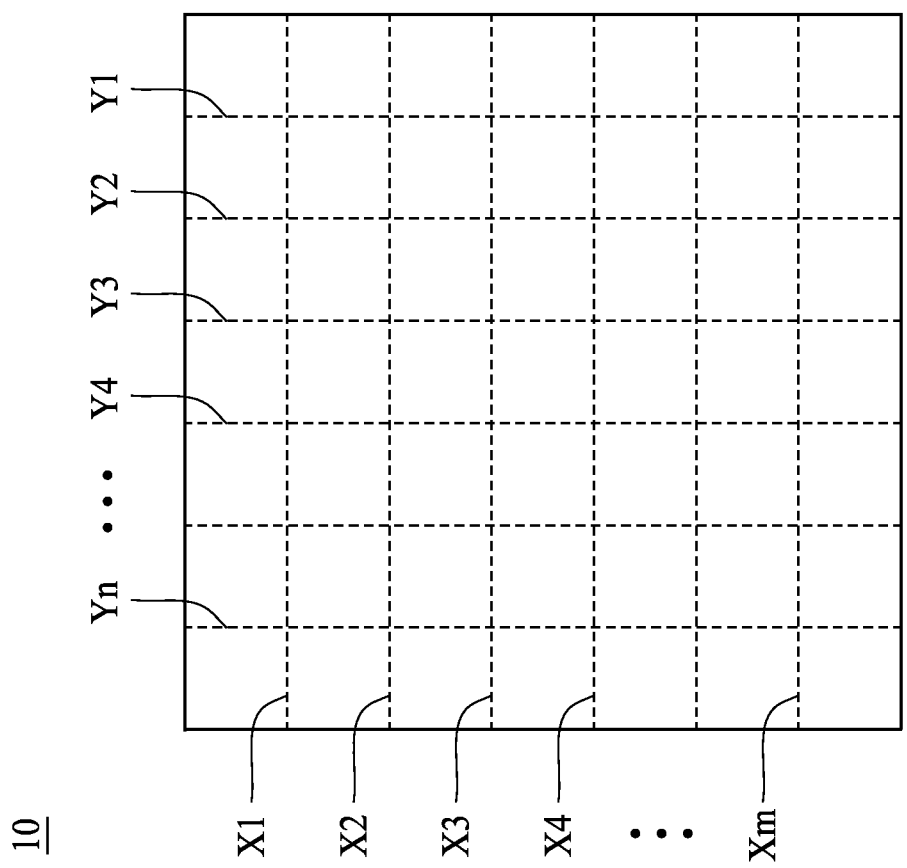
FIG. 1 shows a conventional touch panel.

The embodiments of the present invention are shown on the following description with the drawing, wherein the similar component or the same component is shown in similar reference number.

Figure 2:
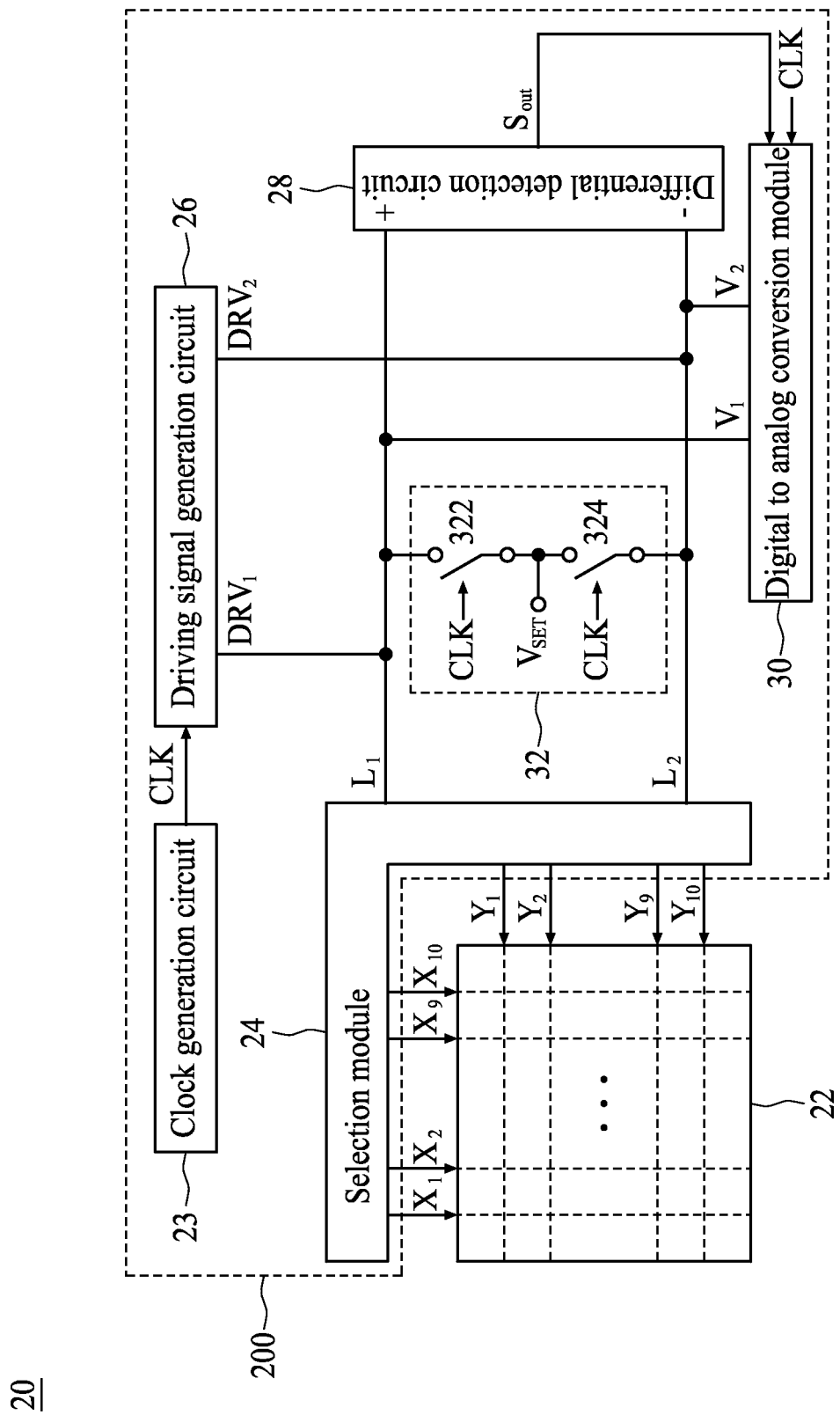
FIG. 2 shows a block diagram for the touch input device according to one embodiment of the present invention.

FIG. 2 show a block diagram of a touch input device 20 according to one embodiment of the presentation invention. The touch input device 20 comprises a touch panel 22 and a control device 200, wherein the control device 200 detects the touch status of the touch panel 22. The touch panel 22 comprises a plurality of X-directional sensing lines $X_1$-$X_{10}$ and a plurality of Y-directional sensing lines $Y_1$-$Y_{10}$. The X-directional sensing lines $X_1$-$X_{10}$ and the Y-directional sensing lines $Y_1$-$Y_{10}$ are buried in different layers of the touch panel 22. Referring to FIG. 2, the X-directional sensing lines $X_1$-$X_{10}$ and the Y-directional sensing lines $Y_1$-$Y_{10}$ are arranged in an interlaced manner to form a sensing grid, but not restricted to orthogonal grid. In the grid, a plurality of mutual capacitors is formed between each X-directional sensing line and each Y-directional sensing line.

The control device 200 comprises a clock generation circuit 23, a selection module 24, a driving signal generation circuit 26, a differential detection circuit 28 and a digital to analog conversion module 30. The clock generation circuit 23 generates a clock signal CLK. The selection module 24 selects a first sensing line $L_1$ and a second sensing line $L_2$ from the X-directional sensing lines $X_1$-$X_{10}$ and the Y-directional sensing lines $Y_1$-$Y_{10}$. The differential detection circuit 28 detects the voltage of the first sensing line $L_1$ and the second sensing line $L_2$ to generate a comparative signal $S_{out}$. The driving signal generation circuit 26 generates a driving signal $DRV_1$ and a driving signal $DRV_2$ to apply individually to the first sensing line $L_1$ and the second sensing line $L_2$ based on the clock signal CLK. The digital to analog conversion module 30 selectively outputs a voltage $V_1$ to the first sensing line $L_1$ or outputs a voltage $V_2$ to the second sensing line $L_2$ based on the comparative signal $S_{out}$ and the clock signal CLK.

Figure 3:
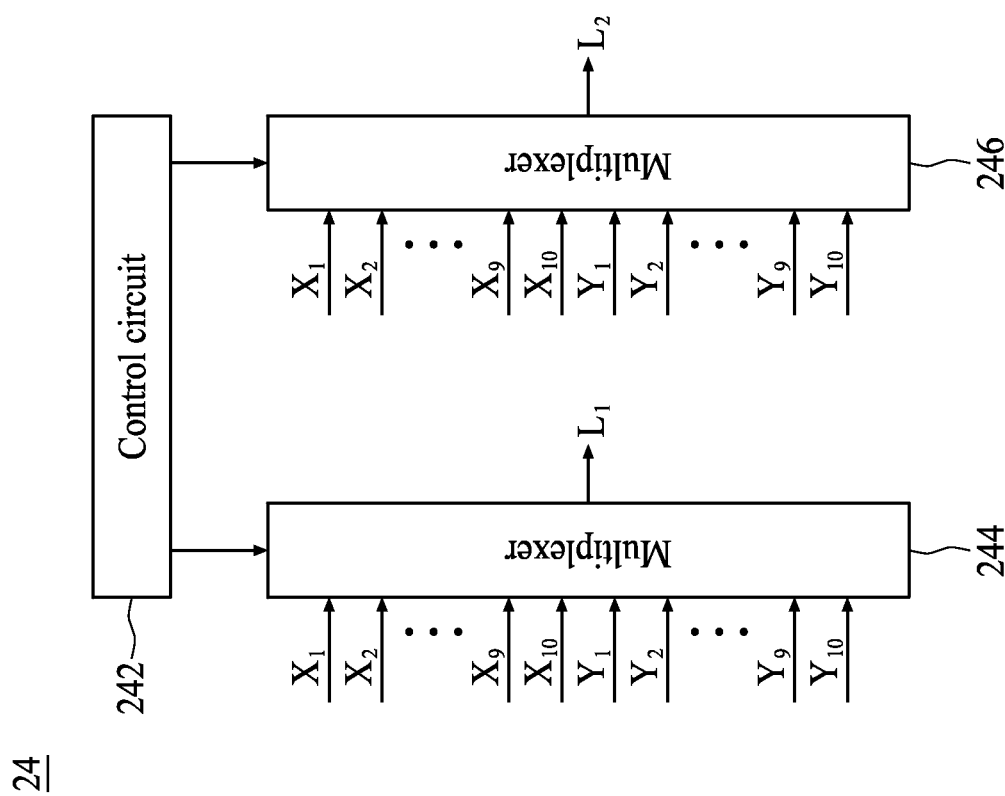
FIG. 3 shows the detail circuit diagram of the selection module according to one embodiment of the present invention.

FIG. 3 shows the detail circuit diagram of the selection module 24 according to one embodiment of the present invention. Referring to FIG. 3, the selection module 24 comprises a control circuit 242 and multiplexers 244 and 246. The multiplexers 244 and 246 couple between the touch panel 22 and the differential detection circuit 28. The control circuit 242 sequentially enables the multiplexers 244 and 246 by designing a predefined scan sequence to select the sensing line $L_1$ and the sensing line $L_2$ for applying driving voltage and measuring voltage in each scan.

Figure 4:
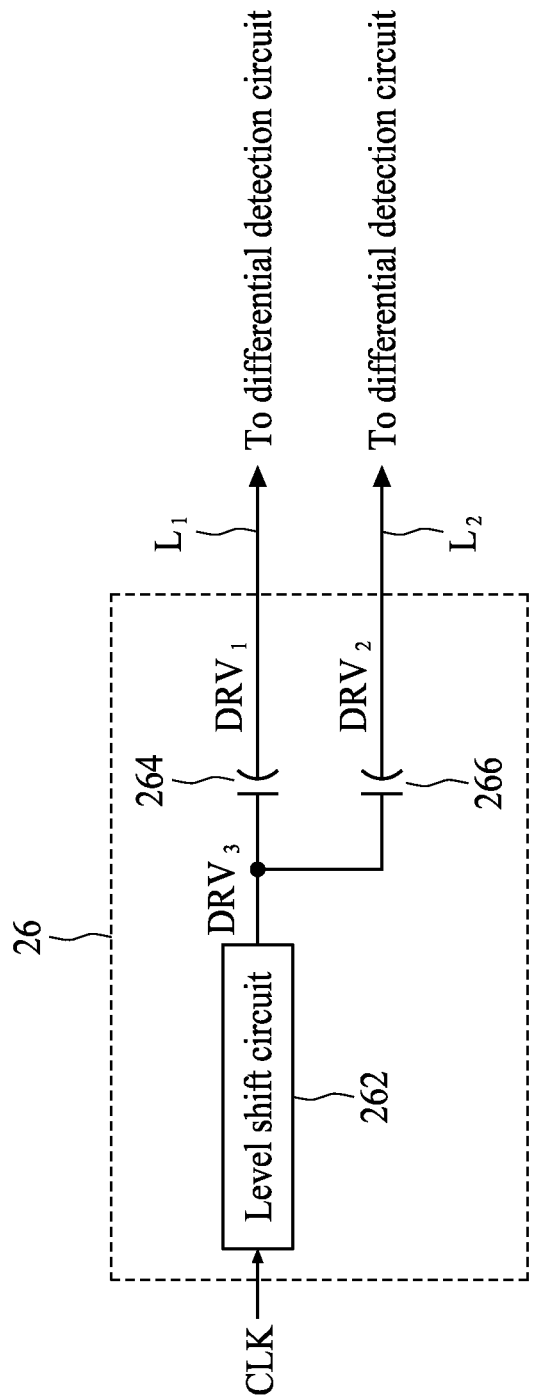
FIG. 4 shows the detail circuit diagram of the driving signal generation circuit according to one embodiment of the present invention.

FIG. 4 shows the detail circuit diagram of the driving signal generation circuit 26 according to one embodiment of the present invention. Referring to FIG. 4, the driving signal generation circuit 26 comprises a level shift circuit 262 and capacitors 264 and 266. The level shift circuit 262 receives the voltage level of the clock signal CLK to generate a driving signal $DRV_3$. The capacitor 264 couples between the level shift circuit 262 and the first sensing line $L_1$ to generate the driving signal $DRV_1$ based on the driving signal $DRV_3$. The capacitor 266 couples between the level shift circuit 262 and the second sensing line $L_2$ to generate the driving signal $DRV_2$ based on the driving signal $DRV_3$. The capacitors 264 and 266 have the same configuration and value.

Figure 5:
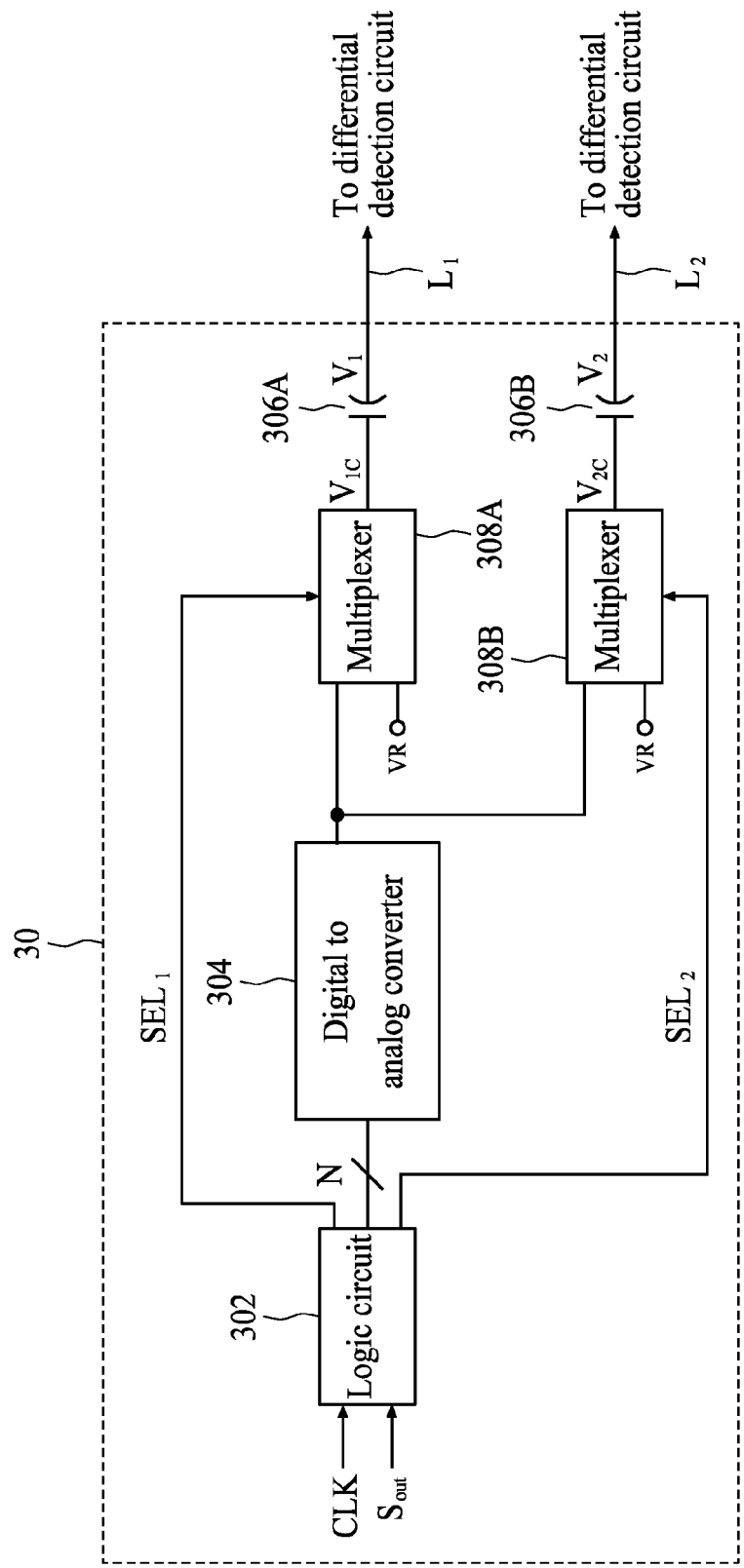
FIG. 5 shows the detail circuit diagram of the digital to analog conversion module according to one embodiment of the present invention.

FIG. 5 shows the detail circuit diagram of the digital to analog conversion module 30 according to one embodiment of the present invention. Referring to FIG. 5, the digital to analog conversion module 30 comprises a logic circuit 302, a digital to analog converter 304, capacitors 306A and 306B and multiplexers 308A and 308B. The logic circuit 302 receives the comparative signal $S_{out}$ and the clock signal CLK to sequentially output N bit signal based a binary search algorithm. The digital to analog converter 304 couples to the logic circuit 302 to sequentially output a plurality of calibration voltage based on the N bit signal. The multiplexers 308A and 308B select a reference voltage VR or the calibration voltage as the output voltage $V_{1c}$ and $V_{2c}$ based on the clock signal CLK and the comparative signal $S_{out}$. The capacitors 306A and 306B separately couple to the multiplexers 308A and 308B to generate couple voltage to the first sensing line $L_1$ and the second sensing line $L_2$ based on the output voltage $V_{1c}$ and $V_{2c}$.

Referring back to FIG. 2, the control device 200 further comprises a reset circuit 32. The reset circuit 32 comprises switches 322 and 324. When the clock signal CLK is low, the reset circuit 32 resets two side of the input of the differential detection circuit 28 to a setting voltage $V_{set}$ by switches 322 and 324.

Figure 6:
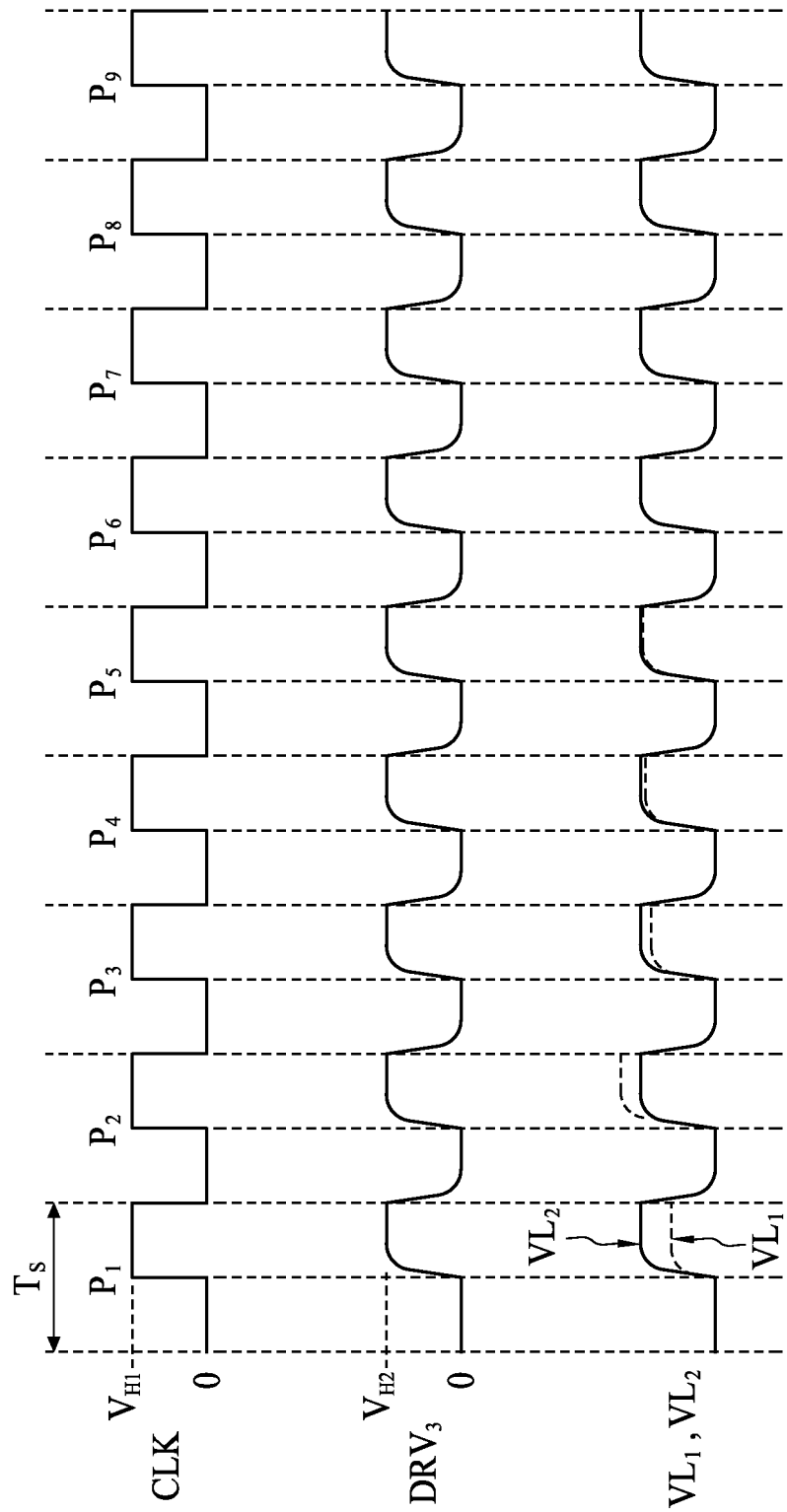
FIG. 6 shows the waveform of the touch input device according to one embodiment of the present invention.

FIG. 6 shows a waveform of the touch input device 20 according to one embodiment of the present invention. Referring to FIG. 6, the clock signal $CLK_1$ comprises a plurality of continuous pulse $P_1$ to $P_9$, and each pulse has a fixed time interval $T_s$. The driving signal $DRV_3$ is generated by the level shift circuit 262, and the high voltage level $V_{H2}$ of driving signal $DRV_3$ can be equal to or greater than the high voltage level $V_{H1}$ of the clock signal CLK. In the first scan, the selection module 24 selects sensing line $X_3$ as the first sensing line $L_1$ from the X-directional sensing line $X_1$-$X_{10}$, and selects the sensing line $X_4$ as the second sensing line $L_2$, then the sensing line $X_3$ connects to the positive input side of the differential detection circuit 28 and the sensing line $X_4$ connects to the negative input side of the differential detection circuit 28.

Referring to FIG. 2 to FIG. 6, during a first pulse $P_1$, when the clock signal CLK is low (ground voltage GND), the reset circuit 32 resets the voltage of two input sides of the differential detection circuit 28 to ground voltage GND. Meanwhile, The driving signal $DRV_3$ is also low (ground voltage GND). When the clock signal CLK transfers to high level $V_{H1}$, switches 322 and 324 are cut off first and make the first sensing line $L_1$ and the second sensing line $L_2$ to floating state. In FIG. 5, the output signal $SEL_1$ and $SEL_2$ of logic circuit 302 control the multiplexers 308A and 308B to output the reference voltage VR (Ground Voltage GND in this point) to capacitors 306A and 306B. The driving signal $DRV_3$ transfers to high voltage $V_{H2}$ through the capacitors 264 and 266 with the same value, then the first sensing line $L_1$ and the second sensing line $L_2$ senses the same variation of driving voltage. In one embodiment of present invention, the sensing line $X_3$ is touched but the sensing line $X_4$ is not touched, so the positive input side voltage $VL_1$ of the differential detection circuit 28 is less than the voltage of the negative input side $VL_2$.

The differential detection circuit 28 can be a voltage comparator, but not restricted to a voltage comparator. When the voltage of positive input side $VL_1$ is less than the voltage of the negative input side $VL_2$, the differential detection circuit 28 generates a comparative signal $S_{out}$ of low level. The logic circuit 302 of the digital to analog conversion module 30 latches the low level at the falling edge of the first pulse $P_1$, and outputs the level as the most significant bit (MSB) of a N bit signal.

In the second pulse $P_2$ period, when the clock signal CLK is low level, the reset circuit 32 resets the two input sides voltage of the differential detection circuit 28 to ground voltage, simultaneously, the multiplexers 308A and 308B are separately controlled by the signal $SEL_1$ and $SEL_2$ of the logic circuit 302 to output the reference voltage VR. When the clock signal CLK transfers to high level $V_{H1}$, switches 322 and 324 are cut off, then the first sensing line $L_1$ and the second sensing line $L_2$ become floating state. Meanwhile, the logic circuit 302 of the digital to analog conversion module 30 controls the digital to analog converter 304 to output a first calibration voltage VDD/2, and output signal $SEL_1$ and $SEL_2$ to the multiplexers 308A and 308B based on the latch low level of the falling edge of first pulse P1, and control the multiplexers 308A and 308B to separately output the first calibration voltage VDD/2 to capacitor 306A and output the reference voltage VR to the capacitor 306B. The voltage variation VDD/2 and 0 of the output voltage $V_{1C}$ and $V_{2C}$ of the multiplexers 308A and 308B separately couple to the first sensing line $L_1$ and the second sensing line $L_2$ through the capacitors 306A and 306B. After the sensing line $L_1$ receives a voltage $V_1$, the differential detection circuit 28 updates the comparative signal $S_{out}$.

In the pulses $P_3$ to $P_9$ period, the digital to analog conversion module 30 repeats similar operation based on the updated comparative signal $S_{out}$. In one embodiment of the present invention, the logic circuit 302 in FIG. 5 comprises a successive approximation register (SAR) to control the output of the digital to analog converter 304 bit by bit based on a binary search algorithm, and outputs a 9 bit signal during continuous pulse $P_1$ to $P_9$ period. The 9 bit signal represents the capacitor variation of the first sensing line $L_1$ and the second sensing line $L_2$. The digital to analog conversion module 30 with the operation during the continuous pulse period has more detail description in the previous application with title "Touch input electronic device" Taiwan patent application no. 99109924.

Figure 7:
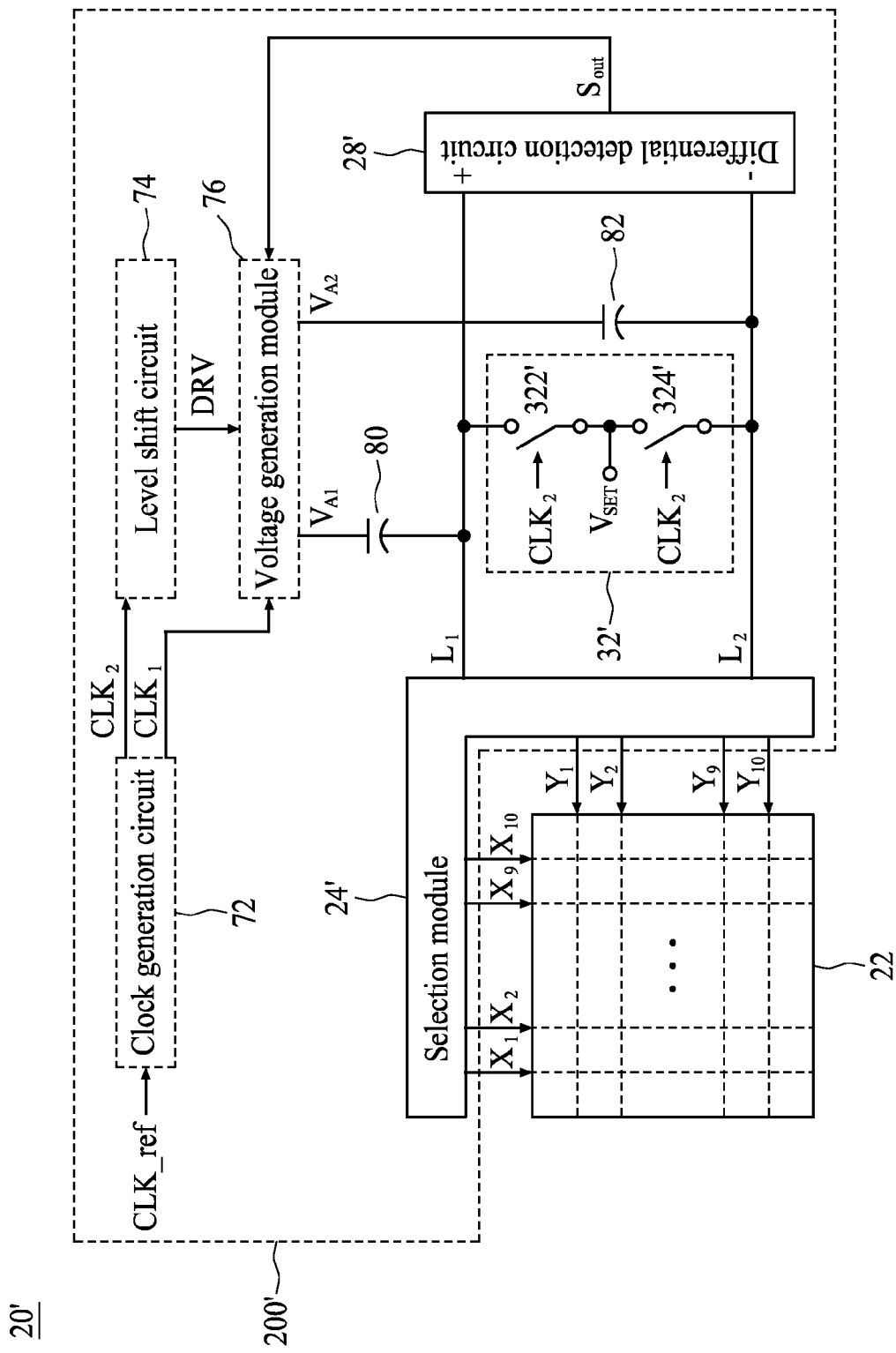
FIG. 7 shows the block diagram of the touch input device according to another embodiment of the present invention.

FIG. 7 shows the block diagram of a touch input device 20' according to another embodiment of the present invention. Referring to FIG. 7, the touch input device 20' comprises a touch panel 22 and a control device 200', wherein the control device 200' detects the touch status of the touch panel 22. The control device 200' comprises a clock generation circuit 72, a level shift circuit 74, a voltage generation module 76, capacitors 80 and 82, a selection module 24' and a differential detection circuit 28'. The clock generation circuit 72 generates clock signals $CLK_1$ and $CLK_2$ based on a reference clock signal CLK_ref. The selection module 24' selects a first sensing line $L_1$ and a second sensing line $L_2$ from the X-directional sensing lines $X_1$-$X_{10}$ and the Y-directional sensing lines $Y_1$-$Y_{10}$. The differential detection circuit 28' detects the voltage of the first sensing line $L_1$ and the second sensing line $L_2$ to generate a comparative signal $S_{out}$.

Referring to FIG. 7, the level shift circuit 74 generates a driving signal DRV based on the voltage of the clock signal $CLK_2$. The voltage generation module 76 generates applied voltage $V_{A1}$ and $V_{A2}$ based on the comparative signal $S_{out}$, the clock signal $CLK_1$ and the driving signal DRV. The capacitor 80 couples between the voltage generation module 76 and the first sensing line $L_1$ to react the variation of the applied voltage $V_{A1}$ to the first sensing line $L_1$. The capacitor 82 couples between the voltage generation module 76 and the second sensing line $L_2$ to react the variation of the applied voltage $V_{A2}$ to the second sensing line $L_2$.

Figure 8:
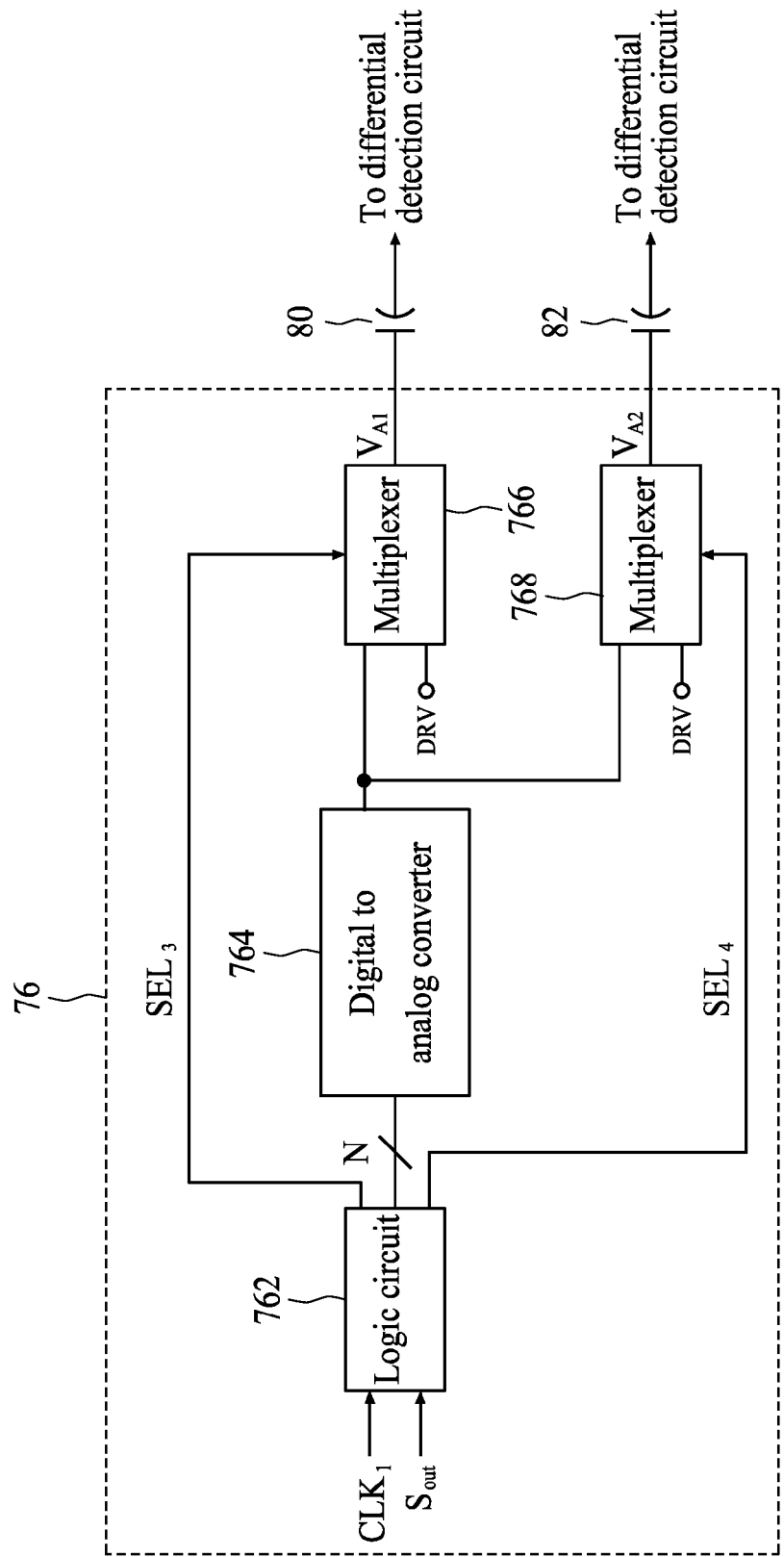
FIG. 8 shows the detail circuit diagram of the voltage generation module according to one embodiment of the present invention.

FIG. 8 shows the detail circuit diagram of the voltage generation module 76 according to one embodiment of the present invention. Referring to FIG. 8, the voltage generation module 76 comprises a logic circuit 762, a digital to analog converter 764 and multiplexers 766 and 768. The logic circuit 762 receives the comparative signal $S_{out}$ and the clock signal $CLK_1$ and sequentially outputs N bit signal based on a binary search algorithm. The digital to analog converter 304 couples to the logic circuit 762 and sequentially outputs a plurality of calibration voltage based on the N bit signal. The multiplexers 766 and 768 select the driving signal DRV or the calibration voltage as the applied voltage $V_{A1}$ and $V_{A2}$ based on the clock signal $CLK_1$ and the comparative signal $S_{out}$.

Referring to FIG. 7, the control device 200' further comprises a reset circuit 32'. The reset circuit 32' comprises switches 322' and 324'. When the clock signal $CLK_2$ is low, the reset circuit 32' resets two input voltage of the differential detection circuit to a setting voltage $V_{SET}$ by the switches 322' and 324'.

Figure 9:
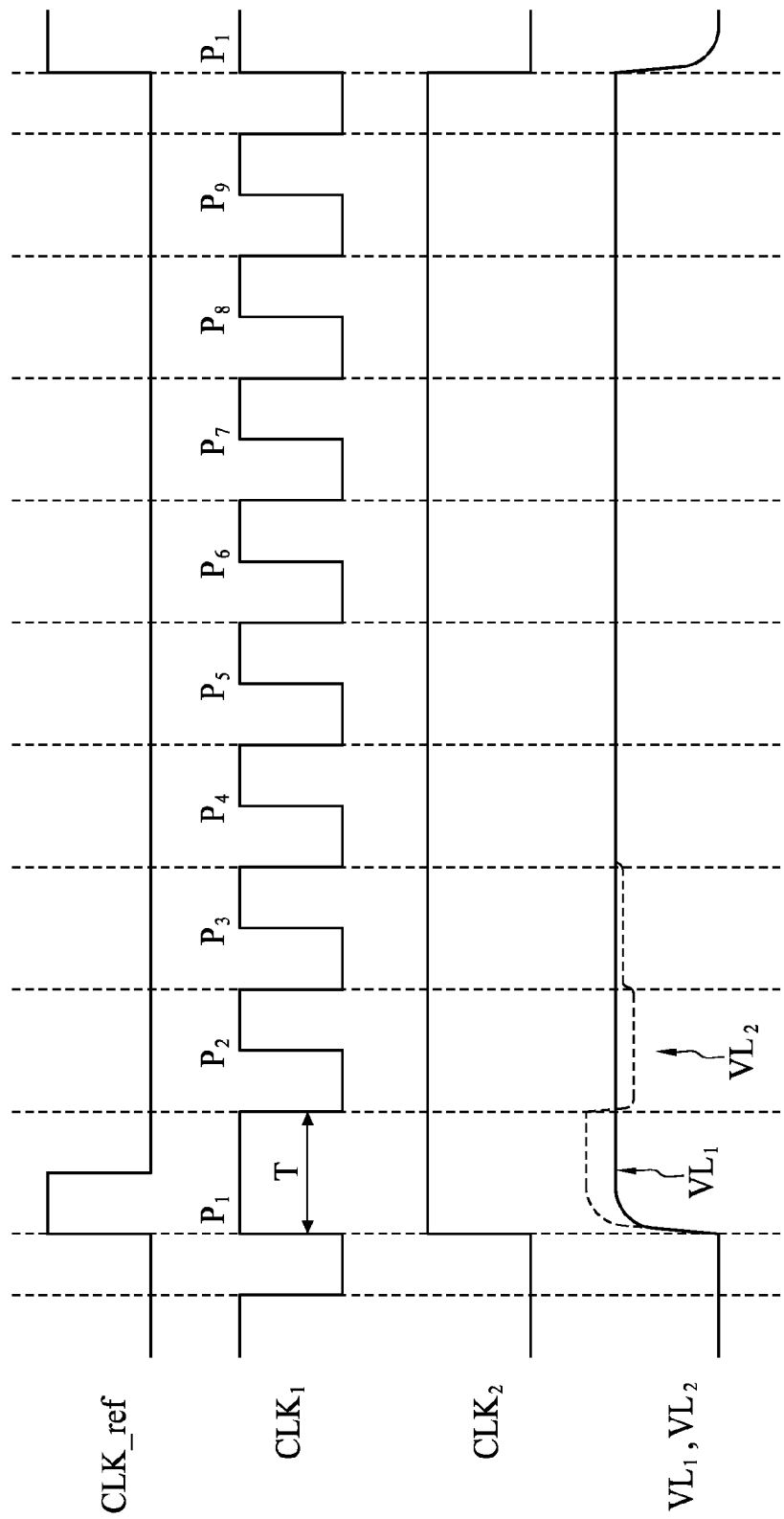
FIG. 9 shows the waveform of the touch input device according to one embodiment of the present invention.

FIG. 9 shows a waveform of the touch input device 20' according to one embodiment of the present invention. Referring to FIG. 9, the clock signal $CLK_1$ is generated based on a rising edge of the reference clock signal CLK_ref. As FIG. 9 shows, the clock signal $CLK_1$ comprises a first pulse $P_1$ and the a plurality of pulses $P_2$ to $P_9$ following the first pulse $P_1$. The pulse width T of first pulse $P_1$ is determined by a resistor-capacitor delay time of the touch panel 22. Besides, the clock signal $CLK_2$ is generated based on a rising edge of the reference clock signal CLK_ref, and the frequency of the clock signal $CLK_2$ is a half of the reference clock signal CLK_ref.

In the first scan, if the selection module 24' selects a sensing line $X_3$ as the first sensing line $L_1$ from the X-directional sensing lines $X_1$-$X_{10}$, selects a sensing line $X_4$ as the second sensing line $L_2$, then the sensing line $X_3$ connects to the positive input side of the differential detection circuit 28', and the sensing line $X_4$ connects the negative input side of the differential detection circuit 28'. Referring to FIG. 7 to FIG. 9, during the first pulse $P_1$, when the pulse signal is low level, the reset circuit 32' resets both input side voltage of the differential detection circuit 28' to ground voltage GND. At this moment, the driving signal DRV is also low level. When the pulse signal transfers to high level, the switches 322 and 324 are cut off first, and the first sensing line $L_1$ and the second sensing line $L_2$ become floating state. Then the driving signal DRV transfers to high level, and the multiplexers 766 and 768 enable to output the driving signal DRV to capacitors 80 and 82. In the embodiment of the present invention, the capacitors 80 and 82 have the same value. Therefore, the first sensing line $L_1$ and the second sensing line $L_2$ sense the same driving voltage variation.

The total voltage of the first sensing line $L_1$ and the second sensing line $L_2$ change with the touch condition. For example, if the sensing line $X_3$ is touched or the touch area is more but the sensing line $X_4$ is not touched or touch area is less, then the voltage $VL_1$ of the first sensing line $L_1$ is less than the voltage $VL_2$ of the second sensing line $L_2$. Under this circumstance, the differential detection circuit 28' outputs the comparative signal $S_{out}$ of a low logic level. The logic circuit 762 of the voltage generation module 76 latches the low level in the falling edge of the first pulse $P_1$, and outputs the signal as the most significant bit of a N bit signal.

During the second pulse $P_2$, the logic circuit 762 of the voltage generation module 76 controls the digital to analog converter 764 to output a first calibration voltage VDD/2 based on the previous latched low level. The logic circuit 762 simultaneously generates a logic signal $SEL_3$ to control the multiplexer 766 and outputs the driving signal DRV to the first sensing line $L_1$ and generates a logic signal $SEL_4$ to control the multiplexer 768 to output the calibration voltage VDD/2 to the second sensing line $L_2$. The differential detection circuit 28' detects the voltage of the sensing line $L_1$ and the sensing line $L_2$ then update the comparative signal $S_{out}$. After that, during the pulse interval of $P_2$ to $P_9$, the logic circuit 762 use previous binary search algorithm to control the output of the digital to analog converter 764 bit by bit. Therefore, a plurality of calibration voltage are applied to the capacitor 82 to adjust the voltage of the second sensing line $L_2$ based on the updated comparative signal $S_{out}$. In the embodiment of the present invention, during the period of continuous pulse $P_1$ to $P_9$, the logic circuit 762 outputs a 9 bit signal. The 9 bit signal represents the capacitor variation of the first sensing line $L_1$ and the second sensing line $L_2$.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A control device applied to a touch panel, wherein the touch panel comprises a plurality of first directional sensing lines and a plurality of second directional sensing lines, the first directional sensing lines and the second directional sensing lines are arranged in an interlaced manner, the control device comprising:

a clock generating circuit configured to generate a first clock signal and a second clock signal based on a reference clock signal, wherein the first clock signal comprises a plurality of pulses, and the frequency of the second clock signal is a half of the reference clock signal frequency or equal to the frequency of the reference clock signal;

a selection module configured to select a first sensing line and a second sensing line between the first directional sensing lines and the second directional sensing lines;

a level shift circuit configured to generate a driving signal based on the voltage level of the second clock signal;

a differential detection circuit configured to generate a comparative signal to detect the voltage of the first sensing line and the second sensing line;

a voltage generation module configured to generate a first applied voltage and a second applied voltage based on the comparative signal, the first clock signal and the driving signal;

a first capacitor coupling between the voltage generation module and the first sensing line to response the variation of the first applied voltage to the first sensing line;

a second capacitor coupling between the voltage generation module and the second sensing line to response the variation of the second applied voltage to the second sensing line;

wherein the first clock signal comprises a first pulse and the following plurality of pulses of the first pulse, the clock generation circuit determines the pulse width of the first pulse based on a resistance-capacitor delay time of the touch panel, and the voltage generation module selects the driving signal as the first applied voltage and the second applied voltage during the first pulse period, and the voltage generation module generates a plurality of calibration voltage to the first capacitance or the second capacitance.

2. The device of claim 1, wherein the control device further comprises a reset circuit, and the reset circuit resets the input voltage of the differential detection circuit to a setting voltage based on the second clock signal.

3. The device of claim 1, wherein the voltage generating module sequentially outputs a N bit signal during the pulse of the first clock signal, and the N bit signal represents the capacitor variance of the first sensing line and the second sensing line.

4. The device of claim 1, wherein the voltage generation module comprises:

a logic circuit configured to receive the comparative signal and the first clock signal, and sequentially outputting the N bit signal based on the binary search algorithm;

a digital to analog converter coupling the logic circuit, configured to sequentially output a plurality of calibration voltage based on the N bit signal;

a first multiplexer configured to select the driving signal or the calibration voltage as the first applied voltage based on the first clock signal and the comparative signal; and a second multiplexer configured to select the driving signal or the calibration voltage as the second applied voltage based on the first clock signal and the comparative signal.

* * * * *